United States Patent
Pursifull

(10) Patent No.: US 9,617,927 B2
(45) Date of Patent: Apr. 11, 2017

(54) METHOD AND SYSTEM FOR SUPPLYING LIQUEFIED PETROLEUM GAS TO A DIRECT FUEL INJECTED ENGINE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 14/532,756

(22) Filed: Nov. 4, 2014

(65) Prior Publication Data

US 2016/0123244 A1 May 5, 2016

(51) Int. Cl.
| | | |
|---|---|---|
| *F02B 19/08* | (2006.01) | |
| *F02D 19/02* | (2006.01) | |
| *F01P 9/02* | (2006.01) | |
| *F02D 28/00* | (2006.01) | |
| *F02D 41/30* | (2006.01) | |
| *F02D 41/38* | (2006.01) | |
| *F02D 33/00* | (2006.01) | |

(52) U.S. Cl.
CPC .......... *F02D 19/022* (2013.01); *F01P 9/02* (2013.01); *F02D 28/00* (2013.01); *F02D 41/3094* (2013.01); *F02D 33/003* (2013.01); *F02D 41/3082* (2013.01); *F02D 41/3809* (2013.01); *F02D 2200/0414* (2013.01)

(58) Field of Classification Search
CPC .... F02D 19/023; F02D 19/022; F02D 33/003; F02D 41/3082; F02D 41/3094; F02D 2200/06; F02D 28/00; F02M 37/08; F02M 37/20; F02M 31/20; F02M 33/08; F02M 59/20; F02M 53/04; F01P 9/02
USPC ........ 701/104, 110; 123/436, 445, 446, 495, 123/497, 514, 541
See application file for complete search history.

(56) References Cited

U.S. PATENT DOCUMENTS

| | | |
|---|---|---|
| 5,479,906 A | 1/1996 | Collie |
| 6,189,516 B1 * | 2/2001 | Hei Ma .................. F02M 17/26 123/514 |
| 7,004,147 B2 | 2/2006 | Kang |
| 7,765,991 B2 | 8/2010 | Thomas et al. |
| 8,091,531 B2 | 1/2012 | Lucido et al. |
| 8,443,785 B2 | 5/2013 | Carter |
| 8,511,287 B2 | 8/2013 | Hofbauer et al. |
| 2007/0144490 A1 | 6/2007 | Serra et al. |

(Continued)

OTHER PUBLICATIONS

Pursifull, Ross D. et al., "Method for Direct Injection of Supercritical Fuels," U.S. Appl. No. 14/579,091, filed Dec. 22, 2014, 53 pages.

(Continued)

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

A method for supplying fuel to a direct injection fuel pump of an internal combustion engine is described. In one example, pressure and/or temperature of a fuel supplied to the direct injection fuel pump may be adjusted to ensure liquid fuel is supplied to the direct injection fuel pump so that the possibility of engine air-fuel ratio errors may be reduced.

19 Claims, 5 Drawing Sheets

(56) References Cited

U.S. PATENT DOCUMENTS

| | | | |
|---|---|---|---|
| 2009/0049897 A1* | 2/2009 | Olin | F02D 41/185 |
| | | | 73/114.32 |
| 2009/0090331 A1 | 4/2009 | Pursifull | |
| 2011/0052427 A1* | 3/2011 | Shaull | F02M 59/102 |
| | | | 417/364 |
| 2014/0123947 A1 | 5/2014 | Song et al. | |
| 2015/0068496 A1* | 3/2015 | Yudanov | F02M 63/0029 |
| | | | 123/456 |

OTHER PUBLICATIONS

Pursifull, Ross D., "System and Method for Operating an Engine Combusting Liquefied Petroleum Gas," U.S. Appl. No. 13/970,519, filed Aug. 19, 2013, 30 pages.

Pursifull, Ross D. et al., "High Pressure Fuel Pump Control for Idle Tick Reduction," U.S. Appl. No. 14/042,971, filed Oct. 1, 2013, 34 pages.

Ulrey, Joseph N. et al., "Currect Pulsing Control Methods for Lift Fuel Pumps," U.S. Appl. No. 14/444,739, filed Jul. 28, 2014, 48 pages.

Ulrey, Joseph N. et al., "Optimizing Intermittent Fuel Pump Control," U.S. Appl. No. 14/558,363, filed Dec. 2, 2014, 44 pages.

Pursifull, Ross D., "Direct Injection Pump Control," U.S. Appl. No. 14/560,497, filed Dec. 4, 2014, 49 pages.

* cited by examiner

METHOD AND SYSTEM FOR SUPPLYING LIQUEFIED PETROLEUM GAS TO A DIRECT FUEL INJECTED ENGINE

BACKGROUND AND SUMMARY

Liquefied petroleum gas (LPG) may be directly injected to engine cylinders. The liquefied petroleum gas may be supplied to a direct fuel injector in a liquid state, and the liquid may vaporize within the cylinder after it is injected into the cylinder to cool cylinder contents and support combustion within the cylinder. By cooling cylinder contents, the engine may be less prone to engine knock so that the engine may be operated with a higher compression ratio to improve engine efficiency. Thus, engine operation may benefit from operating an engine with LPG; however, the LPG may change state to a gas in the fuel system if its pressure is too low or if it becomes supercritical. In a supercritical state, it may be much more difficult to determine the amount of fuel being injected to the engine. Additionally, more energy may be consumed to inject the fuel to the engine because fuel pumps may be less efficient pumping fuel in a supercritical state. Consequently, the benefits of supplying LPG to the engine may be lost or reduced.

One approach that at least partially overcomes the above issues and achieves the technical result of ensuring liquid fuel is supplied to a direct injection fuel pump is disclosed herein. In particular, the approach provides for a method, comprising: increasing cooling of fuel supplied to a direct injection fuel pump in response to direct injection fuel pump volumetric efficiency being less than a threshold.

By increasing cooling of fuel supplied to a direct injection fuel pump in response to direct injection fuel pump volumetric efficiency, it may be possible to maintain flow of liquid fuel to the direct injection fuel pump so that the possibility of engine fueling errors may be reduced. In particular, fuel supplied to the direct injection fuel pump may be cooled so that the fuel does not reach a supercritical state where its mass may be difficult to determine. Additionally, in some examples, pressure of fuel supplied to the direct injection fuel pump may be increased so that the fuel does not reach a supercritical state.

The systems and method disclosed may provide several advantages. For example, the approach may provide improve engine air-fuel ratio control. Additionally, the approach may provide for supplying fuel to an engine using less energy. Further, the approach may reduce degradation of fuel system components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

Figure 1:
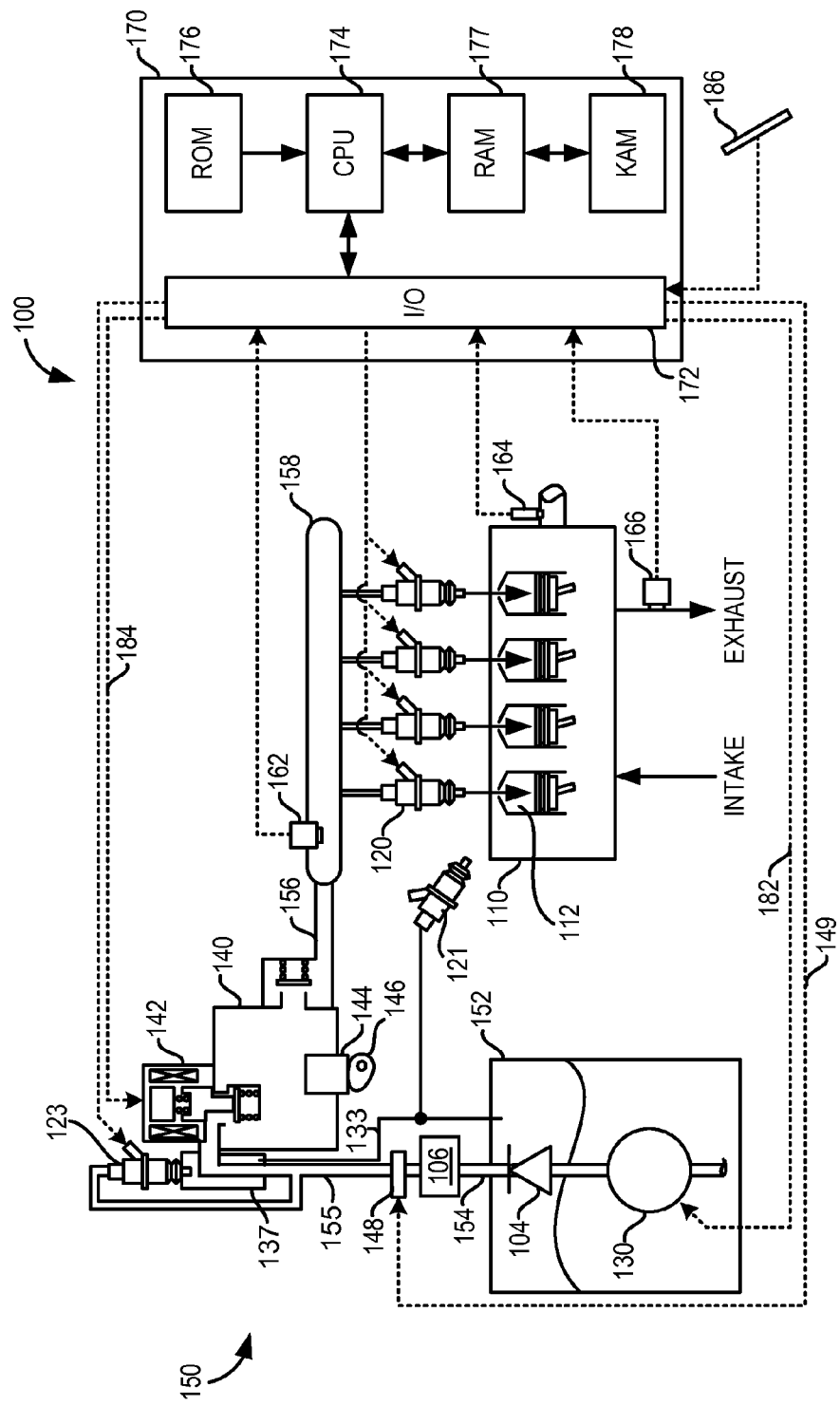
FIG. 1 shows a schematic diagram of an example fuel system coupled to an engine.
Figure 2:
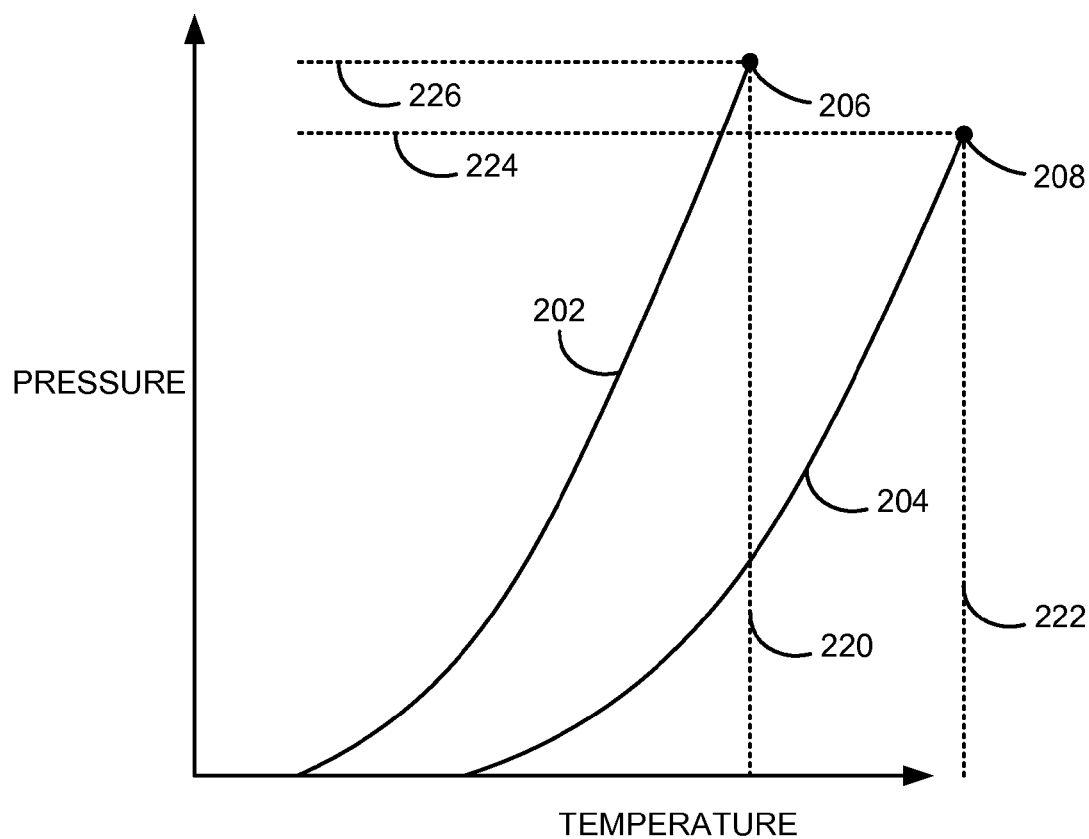
FIG. 2 shows a plot of temperature and pressure where a fuel becomes supercritical.
Figure 3:
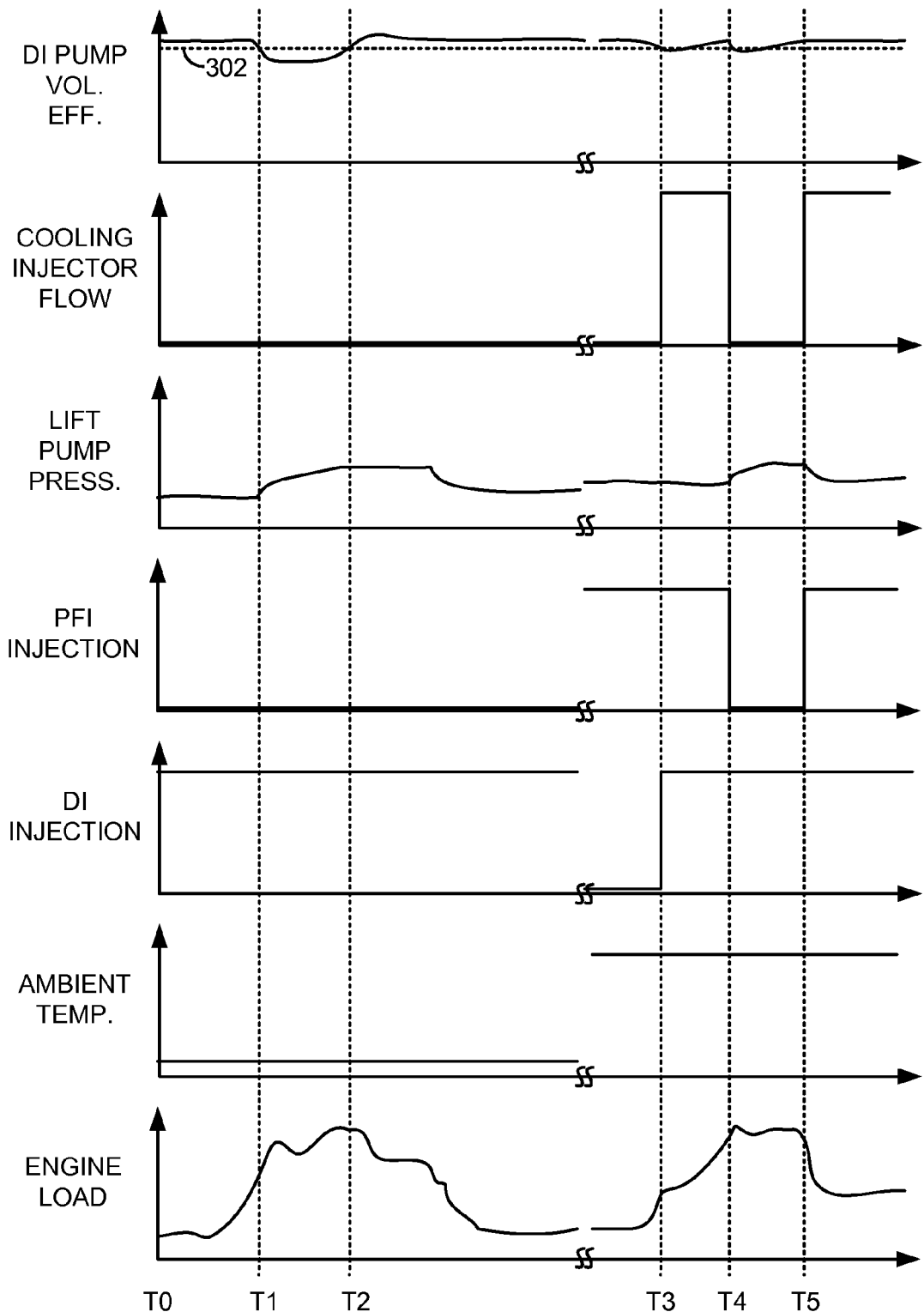
FIG. 3 shows an example prophetic sequence for supplying LPG fuel to a direct injection fuel pump.
Figure 4:
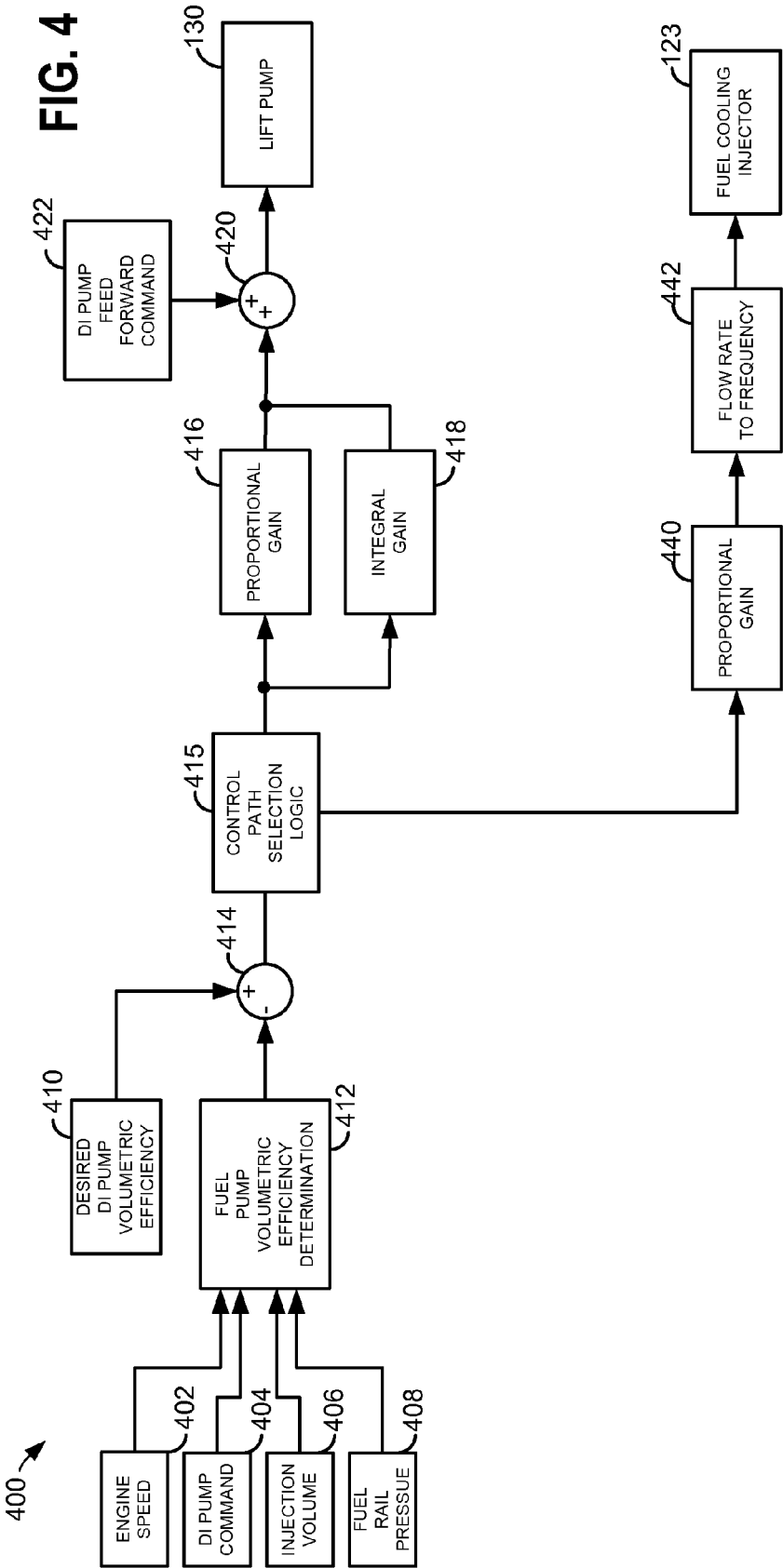
FIG. 4 shows a block diagram of a controller for supplying LPG fuel to a direct injection fuel pump.
Figure 5:
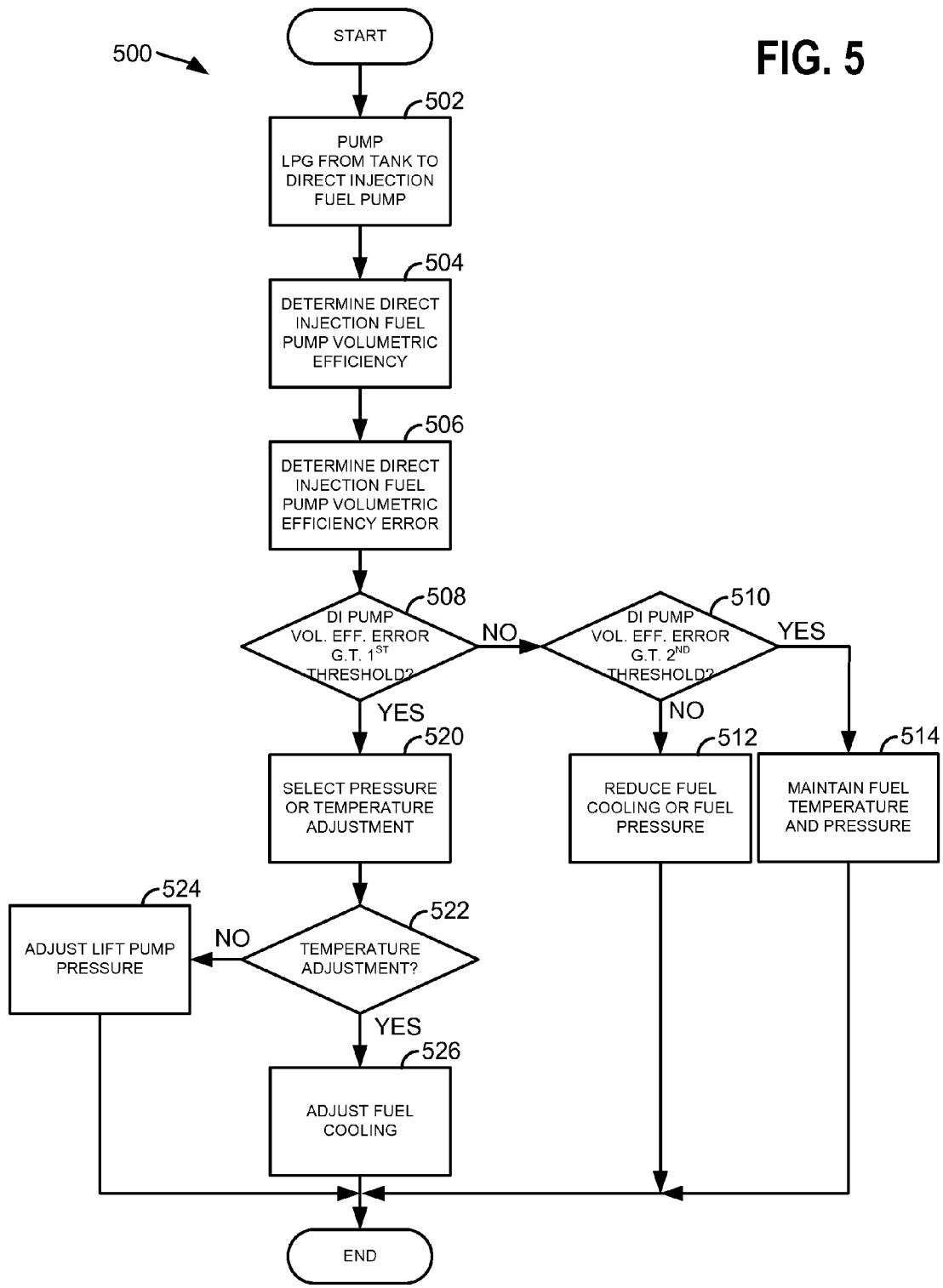
FIG. 5 shows an example method for supplying fuel, such as LPG, to a direct injection fuel pump.

The present description is related to supplying liquefied petroleum gas (LPG) or similar fuels to an internal combustion engine. The engine may be an engine with direct fuel injection where fuel is injected directly into engine cylinders as is shown in FIG. 1. The fuel injected may have properties as are shown in FIG. 2. LPG or alternative fuels may be supplied to the engine by adjusting pressure and temperature at which fuel is fed to a direct injection fuel pump as is shown in FIG. 3. Fuel temperature and pressure may be adjusted via a controller as is shown in FIG. 4. Finally, FIG. 5 shows a method by which LPG may be provided to a direct injection fuel pump and engine cylinders.

FIG. 1 shows a direct injection fuel system 100 coupled to an internal combustion engine 110, which may be configured as a propulsion system for a vehicle. The internal combustion engine 110 may comprise multiple combustion chambers or cylinders 112. LPG fuel can be provided directly to the cylinders 112 via in-cylinder direct injectors 120. As indicated schematically in FIG. 1, the engine 110 can receive intake air and it can exhaust products of the combusted fuel and air.

Fuel can be provided to the engine 110 via the injectors 120 by way of a fuel system indicated generally at 150. In this particular example, the fuel system 150 includes a fuel storage tank 152 for storing the fuel on-board the vehicle, a lower pressure fuel pump 130 (e.g., a fuel lift pump), a higher pressure fuel pump or direct injection fuel pump 140, a fuel rail 158, and various fuel passages 154, 155, and 156. In the example shown in FIG. 1, the fuel passage 154 carries fuel from the lower pressure pump 130 to the fuel filter 106. Fuel passage 155 carries fuel from fuel filter 106 to fuel cooling chamber 137 before fuel reaches direct injection fuel pump 140. Fuel passage 156 carries fuel from the fuel injection pump 140 to the fuel rail 158.

Fuel cooling chamber 137 includes a fuel injector 123 that is supplied fuel from fuel passage 155. Fuel injector may inject fuel into fuel cooling chamber 137 where the pressurized fuel expands to vapor and cools liquid fuel flowing into direct injection fuel pump 140. Expanded fuel may be injected to engine 110 via a port fuel injector 121 which injects vaporized fuel into the engine intake manifold or cylinder intake runners. Alternatively, expanded fuel may exit fuel cooling chamber 137 and be returned to fuel tank 152 via passage 133. Fuel injector 123 is opened and closed via a pulse width modulated voltage supplied by controller 170. This gaseous fuel may also be routed to the fuel vapor purge system which is in place for the gasoline fuel system, if the vehicle is equipped with an auxiliary gasoline system.

Fuel rail 158 may distribute fuel to each of a plurality of fuel injectors 120. Each of the plurality of fuel injectors 120 may be positioned in a corresponding cylinder 112 of engine 110 such that during operation of fuel injectors 120 fuel is injected directly into each corresponding cylinder 112. Alternatively (or in addition), engine 110 may include fuel injectors positioned at the intake port of each cylinder such that during operation of the fuel injectors fuel is injected in to the intake port of each cylinder. In the illustrated example, engine 110 includes four cylinders. However, it will be appreciated that the engine may include a different number of cylinders.

The lower pressure fuel pump 130 can be operated by a controller 170 to provide fuel to fuel injection pump 140 via fuel passage 154. The lower pressure fuel pump 130 can be configured as what may be referred to as a fuel lift pump. As one example, lower pressure fuel pump 130 can include an electric pump motor, whereby the pressure increase across the pump and/or the volumetric flow rate through the pump may be controlled by varying the electrical power provided to the pump motor, thereby increasing or decreasing the motor speed. For example, as the controller 170 reduces the electrical power that is provided to pump 130, the volumetric flow rate and/or pressure increase across the pump 130 may be reduced. The volumetric flow rate and/or pressure increase across the pump may be increased by increasing the electrical power that is provided to the pump 130. As one example, the electrical power supplied to the lower pressure pump motor can be obtained from an alternator or other energy storage device on-board the vehicle (not shown), whereby the control system can control the electrical load that is used to power the lower pressure pump 130. Thus, by varying the voltage and/or current provided to the lower pressure fuel pump 130 via conductor 182, the flow rate and pressure of the fuel provided to fuel injection pump 140 and ultimately to the fuel rail may be adjusted by the controller 170.

Low-pressure fuel pump 130 may be in fluid communication with check valve 104 to facilitate fuel delivery, prevent fuel backflow, and maintain fuel line pressure. In particular, check valve 104 includes a ball and spring mechanism that seats and seals at a specified pressure differential to deliver fuel downstream of check valve 104. In some examples, fuel system 150 may include a series of check valves in fluid communication with low-pressure fuel pump 130 to further impede fuel from leaking back upstream of the valves. Check valve 104 is in fluid communication with fuel filter 106. Fuel filter 106 may remove small impurities that may be contained in the fuel that could potentially restrict fuel flow. Fuel may be delivered from filter 106 to fuel injector 123 and high-pressure fuel pump (e.g., fuel injection pump) 140. Fuel injection pump 140 may increase the pressure of fuel received from the fuel filter from a first pressure level generated by low-pressure fuel pump 130 to a second pressure level higher than the first level. Fuel injection pump 140 may deliver high pressure fuel to fuel rail 158 via fuel line 156. Operation of direct injection fuel pump 140 may be adjusted based on operating conditions of the vehicle in order to reduce noise/vibration/harshness (NVH) which may be perceived positively by a vehicle operator.

The direct injection fuel pump 140 can be controlled by the controller 170 to provide fuel to the fuel rail 158 via the fuel passage 156. As one non-limiting example, fuel injection pump 140 may utilize a flow control valve, a solenoid actuated "spill valve" (SV) or fuel volume regulator (FVR), indicated at 142 to enable the control system to vary the effective pump volume of each pump stroke. The fuel injection pump 140 may be mechanically driven by the engine 110 in contrast to the motor driven lower pressure fuel pump or fuel lift pump 130. A pump piston 144 of the direct injection fuel pump 140 can receive a mechanical input from the engine crank shaft or cam shaft via a cam 146. In this manner, fuel injection pump 140 can be operated according to the principle of a cam-driven single-cylinder pump.

As depicted in FIG. 1, a fuel sensor 148 is disposed in passage 154 downstream of the fuel lift pump 130. The fuel sensor 148 may measure fuel composition and may operate based on fuel capacitance, or the number of moles of a dielectric fluid within its sensing volume. For example, an amount of ethanol (e.g., liquid ethanol) in the fuel may be determined (e.g., when a fuel alcohol blend is utilized) based on the capacitance of the fuel. The fuel sensor 148 may be used to determine a level of vaporization of the fuel, as fuel vapor has a smaller number of moles within the sensing volume than liquid fuel. As such, fuel vaporization may be indicated when the fuel capacitance drops off. As described in greater detail with reference to FIGS. 4 and 5, the fuel sensor 148 may be utilized to determine the level of fuel vaporization of the fuel such that the controller 170 may adjust the lift pump output pressure in order to reduce fuel vaporization within the fuel lift pump 130.

Further, in some examples, the direct injection fuel pump 140 may be operated as the fuel sensor 148 to determine the level of fuel vaporization. For example, a piston-cylinder assembly of the fuel injection pump 140 forms a fluid-filled capacitor. As such, the piston-cylinder assembly allows the fuel injection pump 140 to be the capacitive element in the fuel composition sensor. In some examples, the piston-cylinder assembly of the fuel injection 140 may be the warmest point in the system, such that fuel vapor forms there first. In such an example, the direct injection fuel pump 140 may be utilized as the sensor for detecting fuel vaporization, as fuel vaporization may occur at the piston-cylinder assembly before it occurs anywhere else in the system.

As shown in FIG. 1, the fuel rail 158 includes a fuel rail pressure sensor 162 for providing an indication of fuel rail pressure to the controller 170. An engine speed sensor 164 can be used to provide an indication of engine speed to the controller 170. The indication of engine speed can be used to identify the speed of fuel injection pump 140, since the pump 140 is mechanically driven by the engine 110, for example, via the crankshaft or camshaft. An exhaust gas sensor 166 can be used to provide an indication of exhaust gas composition to the controller 170. As one example, the gas sensor 166 may include a universal exhaust gas sensor (UEGO). The exhaust gas sensor 166 can be used as feedback by the controller to adjust the amount of fuel that is delivered to the engine via the injectors 120. In this way, the controller 170 can control the air-fuel ratio delivered to the engine to a desired air-fuel ratio.

Furthermore, controller 170 may receive other engine/exhaust parameter signals from other engine sensors such as engine coolant temperature, engine speed, throttle position, absolute manifold pressure, emission control device temperature, etc. Further still, controller 170 may provide feedback control based on signals received from fuel sensor 148, pressure sensor 162, and engine speed sensor 164, among others. For example, controller 170 may send signals to adjust a current level, current ramp rate, pulse width of a solenoid valve (SV) 142 of fuel injection pump 140, and the like to adjust operation of fuel injection pump 140, a fuel pressure set-point of fuel pressure regulator, and/or a fuel injection amount and/or timing based on signals from fuel sensor 148, pressure sensor 162, engine speed sensor 164, and the like.

The controller 170 can individually actuate each of the injectors 120 and injector 123. The controller 170 and other suitable engine system controllers can comprise a control system. The controller 170, in this particular example, includes an electronic control unit comprising one or more of an input/output device 172, a central processing unit (CPU) 174, read-only memory (ROM) 176 or non-transitory memory, random-accessible memory (RAM) 177, and keep-alive memory (KAM) 178. The storage medium ROM 176 can be programmed with computer readable data representing non-transitory instructions executable by the processor 174 for performing the methods described below as well as other variants that are anticipated but not specifically listed.

As shown, direct injection fuel system 100 is a returnless fuel system, and may be a mechanical returnless fuel system (MRFS) or an electronic returnless fuel system (ERFS). In the case of an MRFS, the fuel rail pressure may be controlled via a pressure regulator (not shown) positioned at the fuel tank 152. In an ERFS, a pressure sensor 162 may be mounted at the fuel rail 158 to measure the fuel rail pressure relative to the manifold pressure. The signal from the pressure sensor 162 may be fed back to the controller 170 which modulates the voltage to the fuel injection pump 140 for supplying the desired fuel pressure and fuel flow rate to the injectors.

Although not shown in FIG. 1, in other examples, direct injection fuel system 100 may include a return line whereby excess fuel from the engine is returned via a fuel pressure regulator to the fuel tank via a return line. A fuel pressure regulator may be coupled in line with a return line to regulate fuel delivered to fuel rail 158 at a desired pressure. To regulate the fuel pressure at the desired level, the fuel pressure regulator may return excess fuel to fuel tank 152 via the return line. It will be appreciated that operation of fuel pressure regulator may be adjusted to change the desired fuel pressure to accommodate operating conditions.

Thus, the system of FIG. 1 provides for a vehicle system, comprising: an engine; a direct injection fuel pump supplying fuel to the engine, the direct injection fuel pump including a fuel cooling chamber; a cooling injector in fluidic communication with the cooling chamber; a lift pump supplying fuel to the direct injection fuel pump; and a controller including instructions stored in non-transitory memory for increasing fuel flow to the fuel cooling chamber in response to a volumetric efficiency of the direct injection fuel pump. The vehicle system further comprises instructions for increasing output pressure of the lift pump in response to the volumetric efficiency of the direct injection fuel pump. The vehicle system includes where the volumetric efficiency of the direct injection fuel pump is a basis for determining liquid fuel is being supplied to the direct injection fuel pump. The vehicle system further comprises a port fuel injector in fluidic communication with the fuel cooling chamber. The vehicle system further comprises a fuel passage providing fluid communication between the fuel cooling chamber and a fuel tank. The vehicle system includes where the controller includes additional instructions for determining a direct injection fuel pump volumetric efficiency error.

Referring now to FIG. 2, it shows an example plot of temperatures and pressures where two different fuels become supercritical. A fuel such as propane or butane may become supercritical at selected temperatures and pressures. The fuel has no definitive gaseous or liquid phase when it is supercritical. Further, the fuel's density may be difficult to ascertain, thereby making it difficult to inject a desired mass of fuel to meet engine power demands. Consequently, it may be difficult to ensure a desired amount of fuel is injected to reduce the possibility of engine fueling errors.

The plot of FIG. 2 has a Y axis that represents pressure and pressure increases in the direction of the Y axis arrow. The plot of FIG. 2 also includes a X axis that represents temperature and temperature increases in the direction of the X axis arrow.

Curve 202 represents a phase line that separates where propane is liquid or gaseous. Propane is in a liquid state when it is at conditions above curve 202, and it is in a gaseous state when it is at conditions below curve 202. Propane reaches a supercritical state at temperatures and pressures above 206. Horizontal line 226 represents a temperature where propane becomes supercritical. Vertical line 220 represents a temperature where propane becomes supercritical.

Curve 204 represents a phase line that separates where butane is liquid or gaseous. Butane is in a liquid state when it is at conditions above curve 204, and it is in a gaseous state when it is at conditions below curve 204. Butane reaches a supercritical state at temperature and pressures above 208. Horizontal line 224 represents a temperature where butane becomes supercritical. Vertical line 222 represents a temperature where butane becomes supercritical. At temperatures greater than 222, butane is supercritical. At pressures greater than 224, butane is supercritical.

Thus, it may be desirable to hold propane to temperatures less than 220 and pressures less than 226 so that mass of propane supplied to the engine may be accurately determined and regulated. Similarly, it may be desirable to hold butane to temperatures less than 224 and pressures less than 224 so that mass of butane supplied to the engine may be accurately determined and regulated.

It should be noted that controlling direct injection pump volumetric efficiency is different than using temperature and pressure measurements to indicate desired direct injection pump pressure or cooling adjustments. Systems relying on these measurements need to assume a maximally volatile fuel. The present invention does near minimum pressurization and cooling to keep the direct injection fuel pump at full volumetric efficiency.

Turning now to FIG. 3, an example prophetic sequence for supplying LPG fuel to a direct injection fuel pump is shown. The sequence of FIG. 3 may be provided by the system of FIG. 1 according to the method of FIG. 5. The double S along each plot's X axis represents a discontinuity or disruption in the time line. Vertical markers T0-T5 represent times of interest during the operating sequence.

The first plot of FIG. 3 is a plot of direct injection fuel pump volumetric efficiency versus time. The Y axis represents direct injection fuel pump volumetric efficiency and volumetric efficiency increases in the direction of the Y axis arrow. The X axis represents time and time increases in the direction of the X axis arrow. Horizontal line 302 represents a threshold direct injection pump volumetric efficiency. When the direct injection fuel pump volumetric efficiency is above horizontal line 302, fuel is not supplied to the direct injection fuel pump in a supercritical state. When the direct injection fuel pump volumetric efficiency is below horizontal line 302, at least some fuel may be supplied to the direct injection fuel pump in a supercritical state.

The second plot of FIG. 3 is a plot of cooling injector fuel flow state versus time. The Y axis represents cooling injector (e.g., 123 of FIG. 1) fuel flow state. The cooling fuel injector is flowing fuel when the trace it at a higher level near the Y axis arrow. The cooling fuel injector is not flowing when the trace is at a lower level near the X axis. The X axis represents time and time increases in the direction of the X axis arrow.

The third plot of FIG. 3 is a plot of lift or low pressure fuel pump output pressure versus time. The Y axis represents low pressure pump output pressure and pressure increases in the direction of the Y axis arrow. The X axis represents time and time increases in the direction of the X axis arrow.

The fourth plot of FIG. 3 is a plot of port fuel injector fuel flow state versus time. The Y axis represents port fuel injector (e.g., 121 of FIG. 1) fuel flow state. The port fuel injector is flowing fuel when the trace it at a higher level near the Y axis arrow. The port fuel injector is not flowing fuel when the trace is at a lower level near the X axis. The X axis represents time and time increases in the direction of the X axis arrow.

The fifth plot of FIG. 3 is a plot of direct fuel injector fuel flow state versus time. The Y axis represents direct fuel injector (e.g., 120 of FIG. 1) fuel flow state. The direct fuel injector is flowing fuel when the trace it at a higher level near the Y axis arrow. The direct fuel injector is not flowing fuel when the trace is at a lower level near the X axis. The X axis represents time and time increases in the direction of the X axis arrow.

The sixth plot of FIG. 3 is a plot of ambient temperature versus time. The Y axis represents ambient temperature and ambient temperature increases in the direction of the Y axis arrow. The X axis represents time and time increases in the direction of the X axis arrow.

The seventh plot of FIG. 3 is a plot of engine load versus time. The Y axis represents engine load and engine load increases in the direction of the Y axis arrow. The X axis represents time and time increases in the direction of the X axis arrow.

At time T0, the ambient temperature is low and the volumetric efficiency of the direct injection fuel pump is above threshold 302. Cold ambient temperatures may allow fuel (e.g., LPG) to be supplied to the direct injection fuel pump in a liquid state without providing cooling to the fuel via the cooling injector. Consequently, the cooling injector flow is zero and port fuel injection (PFI) is deactivated. The lift pump is supplying fuel to the direct injection fuel pump at a lower middle level. The direct fuel injectors are activated and fuel is directly injected to engine cylinders.

At time T1, the engine load has increased in response to an increase in driver demand torque (not shown). Operating the engine at a higher load may increase fuel temperature since the lift pump may have to increase its output to supply greater amounts of fuel to the engine at higher loads and because the direct injection fuel pump may be in close proximity to the engine which increases heat output at higher loads. The direct injection fuel pump volumetric efficiency is reduced and the lift pump pressure is increased in response to the reduced direct injection fuel pump volumetric efficiency. Increasing pressure at the lift pump outlet operates to ensure the fuel stays in a liquid state as it enters the direct injection fuel pump. Specifically, pressurizing the fuel allows the fuel to remain in a liquid state at higher fuel temperatures. The cooling injector and port fuel injector remain deactivated. The cooling injector is deactivated because operating the cooling injector at low ambient temperatures may cause ice to form at the fuel cooling chamber.

At time T2, the engine load remains at a higher level, but the direct injection fuel pump volumetric efficiency is greater than threshold 302 due to the increase in lift pump pressure. The cooling injector remains off and so does the port fuel injector. The ambient temperature remains low and fuel continues to be directly injected to the engine.

After time T2 and before time T3, the engine load is reduced and the lift pump pressure is reduced because the lift pump is not pumping as much fuel as at the higher engine load. Consequently, fuel heating is reduced.

After the time line brake and before time T3, the ambient temperature increases to a higher level and the engine load is at a low level. The port fuel injector is activated and the cooling injector is off; however, in some examples, the cooling injector may be active if the port fuel injector is being supplied fuel via the cooling injector. The direct injection fuel pump is not supplying fuel to the direct fuel injectors since the direct fuel injectors are off, but the direct injection fuel pump's volumetric efficiency is a higher value since the fuel is being supplied to the direct injection fuel pump in a liquid state. The lift pump is supplying fuel at a lower middle pressure.

At time T3, the engine load has increased and the direct injection fuel pump volumetric efficiency has been reduced to less than threshold 302. Further, the direct fuel injectors and direct injection fuel pump (not shown) have been activated. Also, the ambient temperature remains at a higher level. Consequently, the cooling injector is activated to supply fuel to the cooling chamber which allows the fuel to expand and cool fuel entering the direct injection fuel pump. The lift pump pressure remains at a constant value since it may be more efficient to provide cooling at higher ambient temperatures where the lift pump would have to achieve higher pressures to avoid the fuel becoming supercritical. On the other hand, the liquid fuel evaporates and cools the fuel entering the direct injection fuel pump without having to raise the fuel pressure. The port fuel injector remains active and fuel used to cool the fuel entering the direct injection fuel pump is supplied to the engine via the port fuel injector.

Between time T3 and time T4, the direct injection fuel pump volumetric efficiency increases to greater than level 302 in response to cooling fuel entering the direct injection fuel pump. The engine load also continues to increase.

At time T4, the engine load reaches a higher level where the port fuel injectors are deactivated to allow for maximum engine power output in response to increased driver demand (not shown). If the port fuel injectors were to remain active, fuel vaporization would limit air induction to the engine cylinders. The cooling injector is shown being deactivated; however, if fuel injected to the cooling chamber may be returned to the fuel tank, the cooling injector may remain active. The direct fuel injectors remain active and the lift pump pressure is increased in response to the direct injection fuel pump volumetric efficiency being reduced to less than level 302. The ambient temperature remains at a higher level.

At time T5, the engine load is reduced in response to reduced driver demand (not shown). The lift pump pressure is reduced to reduce energy consumption and the cooling injector and the port fuel injectors are reactivated in response to the reduced engine load and higher ambient temperature. The direct fuel injector remains active since engine load is at a middle level. Operating the cooling injector allows the lift pump to supply liquid fuel to the direct injection fuel pump. Consequently, the direct injection fuel pump operates with a high volumetric efficiency.

In this way, fuel supplied to the direct injection fuel pump may be cooled and/or pressurized to allow the direct injection fuel pump to operate at a high volumetric efficiency. Cooling the fuel may allow the lift pump to be operated with less electrical energy. Further, lift pump pressure may be increased when cooling the fuel may result in ice buildup or when fuel may not be port injected so that engine power may reach a maximum level.

Referring now to FIG. 4, a block diagram of an example controller for supplying LPG or other similar fuels to a direct injection fuel pump and engine is shown. The controller of FIG. 4 may be included in the system of FIG. 1 as executable instructions.

Engine speed enters controller 400 at 402. Engine speed may be determined via an engine position sensor. The engine speed may be converted to a number of pump strokes by multiplying the number of pump strokes in an engine revolution by engine speed. The direct injection fuel pump command enters controller 400 at 404. The direct injection fuel pump controls a position of a valve at the inlet of the direct injection fuel pump that adjust a volume of fuel pumped by the direct injection fuel pump. Fuel injection volume (e.g. full volume per stroke) enters controller 400 at 406. The direct injection fuel pump volume may be predetermined and stored in controller memory. Fuel rail pressure enters controller 400 at 408. Fuel rail pressure may be determined via a fuel pressure sensor such as 162 of FIG. 1.

Controller 400 determines the direct injection fuel pump volumetric efficiency at 412 based on the inputs of engine speed, direct injection fuel pump command, direct injection volume, and fuel rail pressure.

Block 412 involves a conservation of mass computation (not conservation of volume). However, it is the volumetric efficiency that is output. Injection mass, stored mass, and pumped mass are determined. If the fuel rail is supercritical, the density is somewhat uncertain, but for cases of constant fuel rail pressure, that factor is greatly diminished in significance. Injector mass flow rate can be computed conventionally: sqrt(injection_pressure)*density*constant, or it may be computed alternately: air flow rate/UEGO_AFR. By keeping the direct fuel injector pump inlet subcritical, its mass transfer may be computed. If the direct fuel injection pump's mass transfer is reduced significantly, then it may be concluded that the direct injection fuel pump inlet density dropped and pressure or cooling of fuel may be increased. It is desirable to keep the pump inlet subcritical while allowing the pump outlet (the fuel rail) to be supercritical.

The theoretical fuel volume delivered to fuel rail 158 may comprise the fuel volume delivered into fuel rail 158 at 100% efficiency of fuel injection pump, and may be determined according to equation (1):

$$\text{Fuel volume into fuel rail at 100\% efficiency} = (\text{number of pump strokes} * \text{pump command} * \text{full volume per stroke}) \quad (1)$$

Using equation (1), the fuel volume delivered into the rail at 100% efficiency may be calculated over a predetermined time period, for example over a predetermined number of pump strokes. For example, since the direct injection fuel pump is cycled at high frequency, a predetermined number of pump strokes may comprise a plurality of pump strokes so that the fuel volume may be accurately calculated. The full volume per stroke may be predetermined according to the pump design, type of pump and/or the pump operation.

Next, the actual fuel volume injected to the engine is determined according to equation (2):

$$\text{Fuel volume injected} = \Sigma_i[(\text{Desired fuel mass injected}) * \text{fuel density}] \quad (2)$$

In equation (2), the desired fuel mass injected multiplied by the fuel density yields the desired fuel volume injected, which is summed over all i injectors/cylinders to determine the total fuel volume injected to the engine. For consistency, equation (2) is calculated over the same time period or number of pump strokes as equation (1).

Note that if fuel in the fuel rail goes supercritical, it may not be possible to have an accurate read on its density. In this case, the fuel rail pressure may be controlled to a high constant pressure—up near the supercritical pressure. If fuel rail pressure is constant, mass storage change in the fuel rail may be ignored. Next, the fuel rail pressure increase resulting from the fuel pumped to the fuel rail 158 is determined according to equation (3):

$$\text{Fuel rail pressure increase} = \text{Net fuel volume into fuel rail} * \text{Effective modulus} \quad (3)$$

Alternately, the fuel rail pressure increase may be expressed by the relationship shown in equation (3a):

$$\text{Fuel rail pressure increase} = \frac{\text{change in fuel volume}}{\text{fuel rail volume}} * \text{bulk modulus} \quad (3a)$$

Thus, the net fuel volume into the fuel rail may be determined from the difference between the theoretical fuel volume delivered to the fuel rail according to equation (1) multiplied by the pump volumetric efficiency and the fuel volume injected to the engine according to equation (2). The effective modulus characterizes the pressure increase at the fuel rail for a given volume of net fuel volume delivered into the fuel rail. The effective modulus may depend on the fuel rail design (e.g., volume, material of construction, and the like), fuel composition, the fuel system conditions (temperature, pressure, and the like), and the like. For example, a typical effective modulus may be 1.5 MPa/0.25 cc of fuel, and a typical bulk modulus may be 1.5 MPa. The net fuel volume into the fuel rail can be calculated according to equation (4):

$$\text{Net fuel volume into rail} = (\text{Fuel volume into rail@100\% efficiency} * \text{pump volumetric efficiency}) - \text{fuel volume injected} \quad (4)$$

Accordingly, substituting equations (1) and (2) into (3) yields equation (5):

$$\text{Fuel rail pressure increase} = ((\text{Fuel volume into rail@100\% efficiency} * \text{pump volumetric efficiency}) - \text{fuel volume injected}) * \text{effective modulus} \quad (5)$$

Next, the direct injection pump volumetric efficiency is determined by solving equation (5) according to equations (6) and (7):

$$\text{Pump volumetric efficiency} = \frac{\text{Actual pump volume input}}{\text{Nominal pump volume input}} \quad (6)$$

$$\text{Pump volumetric efficiency} = \frac{\left(\left(\frac{\text{Fuel rail pressure increase}}{\text{Effective modulus}}\right) + \text{Fuel Volume Injected}\right)}{\left(\text{Number of pump strokes} * \text{pump commmand} * \text{full volume per stroke}\right)} \quad (7)$$

Thus, according to equation (7), pump volumetric efficiency may be calculated from measured quantities at 412. The direct injection fuel pump volumetric efficiency is input to summing junction 414.

The desired direct injection fuel pump volumetric efficiency is input to controller 400 at 410. The desired direct injection fuel pump volumetric efficiency may be empirically determined and stored to memory. In one example, the desired direct injection fuel pump volumetric efficiency is a value that indicates liquid fuel is being pumped (e.g., a value greater than 90%). The direct injection fuel pump is a very efficient pump unless it is pumping a compressible gas. Consequently, the direct injection fuel pump volumetric efficiency may be a basis for determining if the direct injection fuel pump is being supplied fuel in a supercritical state or a liquid fuel. In one example, the direct injection fuel pump may operate at 92% efficiency if it is pumping liquid. Thus, if the actual direct injection fuel pump volumetric efficiency is less than 90% volumetric efficiency, it may be determined that the direct injection fuel pump is being supplied fuel in a supercritical state. The difference between the actual direct injection fuel pump volumetric efficiency and the desired direct injection fuel pump volumetric efficiency is determined by subtracting the actual direct injection fuel pump volumetric efficiency from the desired direct injection fuel pump volumetric efficiency. The output of summing junction 414 is input to control path logic selector block 415. However, in some examples, block 415 may be eliminated so that lift pump pressure and the cooling injector outputs are adjusted together.

At 415, method 400 judges whether to adjust lift pump output pressure or cooling injector flow to drive the fuel supplied to the direct injection fuel pump into a liquid state. If the output of summing junction is zero plus or minus a predetermined amount, neither the lift pump pressure nor the cooling injector is adjusted. However, if the value is positive and greater than the predetermined amount, the lift pump pressure or the cooling injection is adjusted. In one example, the logic at 415 selects adjusting the lift pump pressure or the cooling injector flow based on conditions including ambient temperature, engine load, and fuel flow rate. If the ambient temperature is low, the fuel pressure is increased at the direct injection fuel pump because operating the cooling injector may create icing conditions in the fuel cooling chamber. By increasing the fuel pressure, the fuel may transition from a supercritical state back into a liquid state.

On the other hand, if the ambient temperature is high, the cooling injector may be operated, except at high engine load conditions. However, if fuel passing through the cooling injector may be returned to the fuel tank when the engine is operating at high loads, the cooling injector may be operated at the same time lift pump pressure is increased. If the engine is operating at low loads when ambient temperature is high, the cooling injector may be activated and the fuel may be supplied to the engine partially or solely via one or more port fuel injectors. If the engine is operating at middle loads where ambient temperature is high, the direct fuel injector may be activated while the cooling injector is active and while fuel is also being supplied to the engine via the port fuel injector. If the lift pump pressure is to be adjusted, the direct injection fuel pump volumetric efficiency error is passed from summing junction 414 to proportional gain 416 and integral gain 418. Otherwise, if the cooling injector flow is to be adjusted, the direct injection fuel pump volumetric efficiency error is passed from summing junction 414 to proportional gain block 440.

At proportional gain block 416, a proportional gain multiplies the direct fuel injection volumetric efficiency to provide a portion of a lift pump voltage or power adjustment. Similarly, at integral gain block 418, an integral gain multiplies the direct fuel injection volumetric efficiency to provide a portion of the lift pump voltage or power adjustment. The results from the proportional and integral multiplications are added and provided to summing junction 420.

At summing junction 420, the summed proportional and integral error corrections are added to a direct injection fuel pump open loop command from block 422. The direct injection fuel pump open loop command may be empirically determined and stored into controller memory as entries in a table that is indexed via engine speed and load. The table outputs a lift pump command voltage or power that is provided to lift pump 130 along with the proportional and integral error corrections. In this way, the lift pump pressure may be increased if the direct fuel injection fuel pump is not being supplied liquid fuel.

At proportional gain block 440, a proportional gain multiplies the direct fuel injection volumetric efficiency to provide a cooling fuel flow rate per engine revolution that is provided by injector 121 of FIG. 1. The proportional gain at 440 may be significantly different than the proportional gain at 418. The result from the proportional multiplication is provided to a fuel injection flow rate to duty cycle transfer function. The transfer function converts cooling fuel flow rate to a duty cycle that is supplied to the cooling injector. In one example, the cooling injector is supplied a voltage at a fixed frequency and the duty cycle of the frequency is adjusted to adjust the cooling fuel flow rate. The cooling fuel injector 123 is supplied the duty cycle and fuel entering the direct injection fuel pump is cooled by a portion of fuel diverted from the direct injection fuel pump to the cooling chamber. The injector that meters liquid fuel 121 into the cooling jacket 137 may have to be limited until the cooling jacket pressure can be reduced to some level via gaseous injector 121. Or said another way, the gaseous fuel injector 121 needs its rate increased as the liquid injector 121 increases it flow rate.

Referring now to FIG. 5, a method for supplying fuel, such as LPG, to a direct injection fuel pump is shown. The method of FIG. 5 may be included in a system as shown in FIG. 1 as executable instructions stored in non-transitory memory. Further, the method of FIG. 5 may provide the operating sequence shown in FIG. 4.

At 502, method 500 pumps fuel from a fuel tank via a low pressure or lift pump to a direct injection fuel pump. The low pressure pump may be electrically driven and the pump speed may be controlled via controlling a voltage, current, or power applied to the pump via a controller as shown in FIG. 1. The voltage of the low pressure pump may be adjusted to a level that raises fuel pressure to a level sufficient to supply liquid fuel to the direct injection fuel pump to operate the engine at stoichiometric conditions at the desired engine speed and load without increasing fuel pressure beyond a pressure where liquid fuel is supplied to the direct injection fuel pump and where the engine's fueling requirements are met. In one example, the lift pump voltage is commanded open loop based on engine speed and load. In particular, a table that outputs an empirically determined value of lift pump voltage based on engine speed and load is indexed and the table outputs a desired lift pump voltage which is applied by the controller. Method 500 proceeds to 504 after the lift pump voltage is output.

At 504, method 500 determines the direct injection fuel pump volumetric efficiency as described at 412 of FIG. 4. The direct injection fuel pump's volumetric efficiency may be an estimate of whether the direct injection fuel pump is being supplied liquid fuel (e.g., desirable) or fuel in gaseous or supercritical state (e.g., less desirable). By knowing the state of fuel supplied to the direct injection fuel pump, mitigating actions may be taken to pressurize and or cool fuel entering the direct injection fuel pump if fuel being supplied to the direct injection fuel pump is in a supercritical state. Method 500 proceeds to 506 after the direct injection fuel pump volumetric efficiency is determined.

At 506, method 500 determines the direct fuel injector pump's volumetric efficiency error. In one example, method 500 subtracts the actual or estimated direct injection fuel pump volumetric efficiency from the desired direct injection fuel pump volumetric efficiency to determine the direct injection fuel pump volumetric efficiency error. Method 500 proceeds to 508 after the direct injection fuel pump volumetric efficiency is determined.

At 508, method 500 judges if the direct injection fuel pump volumetric efficiency error is greater than a first threshold. In one example, the first threshold may be a volumetric efficiency error based on a volumetric efficiency where the direct injection fuel pump is pumping a small amount of gaseous or unknown state fuel (e.g., 8% Vol. Eff. error). If so, the answer is yes and method 500 proceeds to 520. Otherwise, the answer is no and method 500 proceeds to 510.

At 510, method 500 judges if the direct injection fuel pump volumetric efficiency error is greater than a second threshold. In one example, the second threshold may be a volumetric efficiency error based on a volumetric efficiency where the direct injection fuel pump is pumping mostly liquid fuel (e.g., 2% Vol. Eff. error). If so, the answer is yes and method 500 proceeds to 514. Otherwise, the answer is no and method 500 proceeds to 512.

At 514, method 500 makes no changes to the pressure of fuel being supplied to the direct injection fuel pump via the lift pump because the additional pressure may increase electrical energy consumption without providing any additional benefit in terms of supplying liquid fuel to the direct injection fuel pump. Likewise, method 500 does not increase fuel cooling by increasing the amount of fuel evaporated to cool fuel entering the direct injection fuel pump. Method 500 proceeds to exit after the lift pump pressure and cooling fuel flow are maintained at their present values. If the engine is being operated in a high power mode, it is preferable to maximize the proportion of fuel injected via direct fuel injectors. Therefore, the fuel pressure may be increased for the fuel to remain subcritical. However, in hot ambient conditions fuel cooling may be necessary. Fuel cooling raises the fraction of fuel entering the engine via gaseous port fuel injectors. And in low load conditions, cooling may result in lower electrical power consumed than raising direct injector pump inlet pressure via high lift pump electrical power.

At 512, method 500 reduces either or both of fuel pressure supplied to the direct injection fuel pump or cooling of fuel supplied to the direct injection fuel pump. The fuel pressure and/or fuel cooling may be lowered to reduce the amount of energy used to supply liquid fuel to the direct injection fuel pump when it is estimated that the direct injection fuel pump is receiving liquid fuel. In one example, the voltage supplied to the direct injection fuel pump may be reduced by a predetermined amount when the direct injection fuel pump volumetric efficiency error is less than a threshold value. Likewise, the amount of fuel injected by the cooling injector to the cooling chamber may be reduced a predetermined amount in response to the direct injection fuel pump volumetric efficiency error being less than the threshold value. In this way, the pressure and temperature of fuel being supplied to the direct injection fuel pump may be lowered to reduce the amount of energy consumed to supply the direct injection fuel pump liquid fuel. The amount of cooling is lowered via reducing a fuel pulse width command supplied to the cooling injector. The lift pump pressure is lowered by reducing the voltage supplied to the low pressure or lift pump. Method 500 proceeds to exit after the fuel cooling and/or fuel pressure are reduced.

At 520, method 500 selects whether to cool fuel entering the direct injection fuel pump or to lower pressure of fuel entering the direct injection fuel pump. Alternatively, fuel entering the direct fuel injection may have its pressure increased and its temperature reduced. In one example, method 500 selects whether to cool or pressurize fuel entering the direct injection fuel pump as described at 412 of FIG. 4. Additionally, if the lift pump is of higher capacity and can supply more fuel than the engine is capable of consuming, the cooling fuel flow rate may be increased to a level where liquid fuel is supplied to the direct injection fuel pump while the direct fuel injectors are supplying the engine's fuel requirements. Method 500 proceeds to 522 after selecting to cool or pressurize fuel entering the direct injection fuel pump to ensure fuel is supplied to the direct injection fuel pump in a liquid state.

At 522, method 500 judges if the fuel is to be cooled or pressurized based on the selection at 520. If it is determined that the fuel is to be cooled and pressurized, method 500 proceeds to 524 and 526. If method 500 judges that only fuel cooling is desired, method 500 proceeds to 526. If method 500 judges that only fuel pressurization (e.g., increasing fuel pressure) is desired, method 500 proceeds to 524.

At 524, method 500 increases fuel pressure proportionately based on the direct injection fuel pump volumetric efficiency error. In particular, voltage supplied to the lift pump is increased to raise pressure of fuel being supplied to the direct injection fuel pump proportionately with the direct injection fuel pump volumetric efficiency error. In one example, a proportionate gain may be stored in memory. Method 500 proceeds to exit after the pressure of fuel supplied to the direct injection fuel pump is increased.

At 526, method 500 increases fuel cooling by increasing fuel flow through the cooling injector. The cooling injector injects fuel into the fuel cooling chamber where it may be returned back to the fuel tank after it cools fuel entering the direct injection fuel pump, or fuel for cooling may be injected to the engine via one or more port fuel injectors. Specifically, the flow of fuel through the cooling injector may be increased via increasing a duty cycle of a voltage supplied to the cooling injector. By increasing the duty cycle, the cooling injector may be open for a longer time each engine cycle so that cooling of fuel entering the direct injection fuel pump may be increased. In one example, the amount of fuel flowing through the cooling injector during an engine cycle (e.g., two engine revolutions) may be increased in proportion to the direct injection fuel pump volumetric efficiency error. Method 500 proceeds to exit after the amount of fuel flowing through the cooling injector is increased.

In this way, temperature of fuel delivered to the direct injection fuel pump may be decreased and pressure of fuel supplied to the direct fuel injector pump may be increased to ensure liquid fuel is supplied to the direct injection fuel pump. Additionally, if volumetric efficiency of the direct injection fuel pump is high, fuel cooling may be reduced along with fuel pressure to reduce energy used to supply liquid fuel to the direct injection fuel pump.

Thus, the method of FIG. 5 provides for a method, comprising: increasing cooling of fuel supplied to a direct injection fuel pump in response to direct injection fuel pump volumetric efficiency being less than a threshold. The method further comprises increasing pressure of fuel supplied to the direct injection fuel pump in response to the direct injection fuel pump volumetric efficiency being less than the threshold value. The method further comprises determining a volumetric efficiency error and adjusting cooling of fuel supplied to the direct injection fuel pump in response to the volumetric efficiency error.

In some examples, the method includes where cooling of fuel supplied to the direct injection fuel pump is performed via injecting a fuel into a cooling chamber. The method further comprises supplying the fuel to an engine via a port fuel injector. The method further comprises returning the fuel to a fuel tank. The method includes where the volumetric efficiency is based on engine speed, a direct injection fuel pump command, and a fuel injection volume.

In some examples, the method of FIG. 5 provides for a method, comprising: increasing cooling of fuel supplied to a direct injection fuel pump in response to direct injection fuel pump volumetric efficiency being less than a threshold without increasing fuel pressure supplied to the direct injection fuel pump, in a first mode; and increasing pressure of fuel supplied to the direct injection fuel pump in response to direct injection fuel pump volumetric efficiency being less than the threshold without decreasing temperature of fuel supplied to the direct injection fuel pump, in a second mode. The method includes where the second mode is performed at ambient temperatures less than a threshold temperature.

Further, the method includes where the first mode is performed at ambient temperatures greater than the threshold temperature. The method also includes where the second mode is performed at engine loads greater than a threshold load. The method further comprises cooling fuel supplied to the direct injection fuel pump via fuel evaporation. The method further comprises port injecting fuel supplied to cool fuel entering the direct injection fuel pump. The method further comprises returning fuel supplied to cool fuel entering the direct injection fuel pump to a fuel tank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
increasing cooling of fuel supplied to a direct injection fuel pump in response to direct injection fuel pump volumetric efficiency being less than a threshold, where cooling of fuel supplied to the direct injection fuel pump is performed via injecting a fuel into a cooling chamber.

2. The method of claim 1, further comprising increasing pressure of fuel supplied to the direct injection fuel pump in response to the direct injection fuel pump volumetric efficiency being less than the threshold.

3. The method of claim 1, further comprising determining a volumetric efficiency error and adjusting cooling of fuel supplied to the direct injection fuel pump in response to the volumetric efficiency error.

4. The method of claim 1, further comprising supplying the fuel to an engine via a port fuel injector.

5. The method of claim 1, further comprising returning the fuel to a fuel tank.

6. The method of claim 1, where the volumetric efficiency is based on engine speed, a direct injection fuel pump command, and a fuel injection volume.

7. A method, comprising:
increasing cooling of fuel supplied to a direct injection fuel pump in response to direct injection fuel pump volumetric efficiency being less than a threshold without increasing fuel pressure supplied to the direct injection fuel pump by injecting a fuel into a cooling chamber, in a first mode; and
increasing pressure of fuel supplied to the direct injection fuel pump in response to direct injection fuel pump volumetric efficiency being less than the threshold without decreasing temperature of fuel supplied to the direct injection fuel pump, in a second mode.

8. The method of claim 7, where the second mode is performed at ambient temperatures less than a threshold temperature.

9. The method of claim 8, where the first mode is performed at ambient temperatures greater than the threshold temperature.

10. The method of claim 7, where the second mode is performed at engine loads greater than a threshold load.

11. The method of claim 7, where the fuel injected into the cooling chamber expands to vapor and cools the fuel supplied to the direct injection fuel pump.

12. The method of claim 11, further comprising port injecting fuel supplied to cool fuel entering the direct injection fuel pump.

13. The method of claim 11, further comprising returning the fuel injected to the cooling chamber to a fuel tank.

14. A vehicle system, comprising:
an engine;
a direct injection fuel pump supplying fuel to the engine, the direct injection fuel pump including a fuel cooling chamber;
a cooling injector in fluidic communication with the fuel cooling chamber;

a lift pump supplying fuel to the direct injection fuel pump; and a controller including instructions stored in non-transitory memory for increasing fuel flow to the fuel cooling chamber in response to a volumetric efficiency of the direct injection fuel pump.

15. The vehicle system of claim 14, further comprising instructions for increasing output pressure of the lift pump in response to the volumetric efficiency of the direct injection fuel pump.

16. The vehicle system of claim 14, where the volumetric efficiency of the direct injection fuel pump is a basis for determining liquid fuel is being supplied to the direct injection fuel pump.

17. The vehicle system of claim 14, further comprising a port fuel injector in fluidic communication with the fuel cooling chamber.

18. The vehicle system of claim 14, further comprising a fuel passage providing fluid communication between the fuel cooling chamber and a fuel tank.

19. The vehicle system of claim 14, where the controller includes additional instructions for determining a direct injection fuel pump volumetric efficiency error.

* * * * *